UNITED STATES PATENT OFFICE.

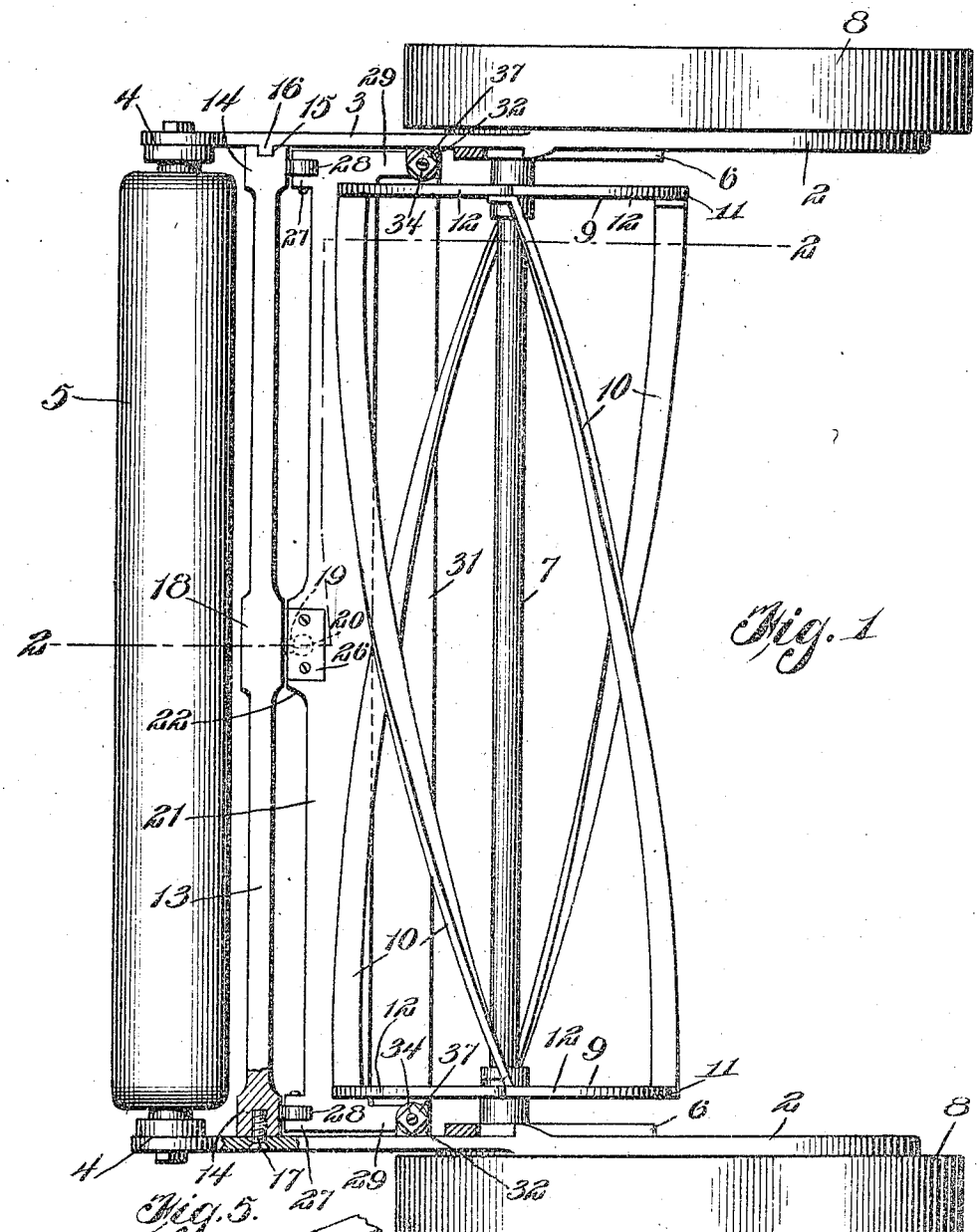

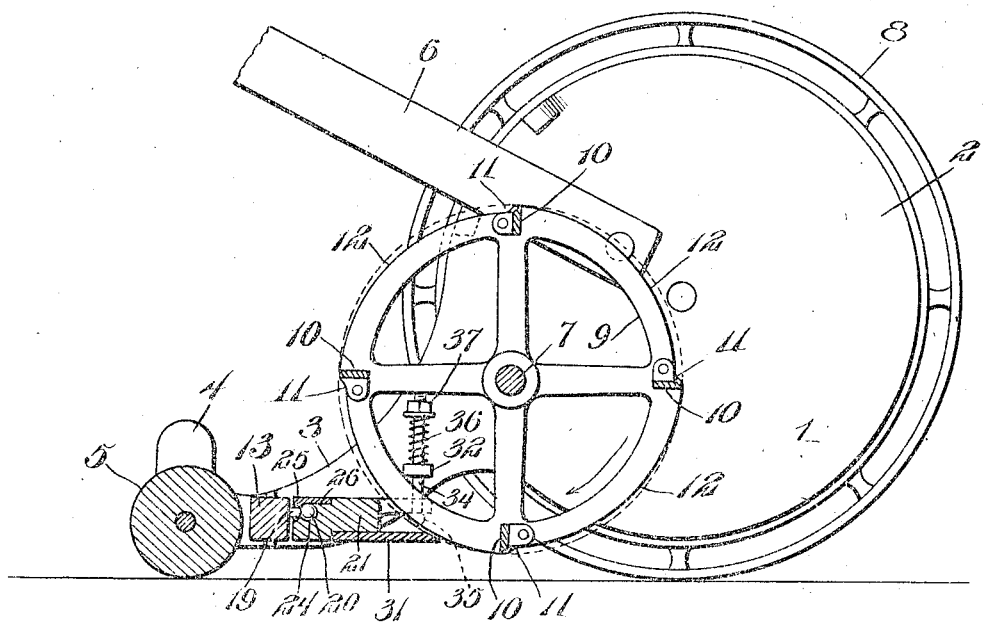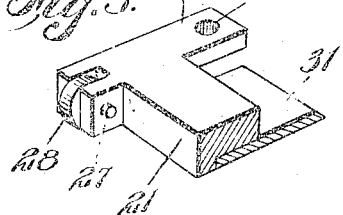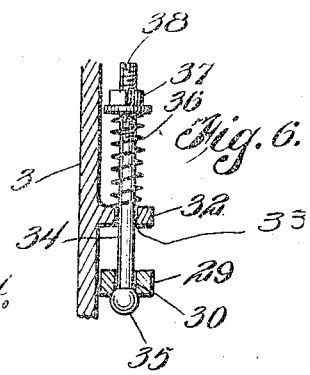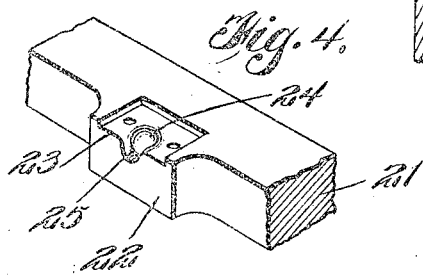

HYMAN EUGENE COONS, OF POTOSI, WISCONSIN.

CUTTING APPARATUS.

1,261,709.     Specification of Letters Patent.     Patented Apr. 2, 1918.

Application filed June 20, 1916. Serial No. 104,777.

*To all whom it may concern:*

Be it known that I, HYMAN EUGENE COONS, a citizen of the United States, residing at Potosi, in the county of Grant and State of Wisconsin, have invented new and useful Improvements in Cutting Apparatus, of which the following is a specification.

This invention relates to a lawn mower and the primary object of the invention is to provide a cutting device of this character wherein a cutter bar mounted for oscillatory movement below and to one side of the axis of the cutting reel has the blade thereon yieldably yet firmly pressed against a cutting edge of the blades of the cutting reel during the passage of the blades on the cutting reel over the blade on the cutter bar.

Another object of the invention is to provide a lawn mower in which rings constituting a part of the reel have formed thereon cam faces, arranged between the blades of the reel and adapted during the rotation of the reel to engage the blade on the cutter bar and oscillate the cutter bar to insure the blades on the cutting reel passing thereon.

With these and other objects in view, the invention resides in the novel combination and arrangement of parts, which will be hereinafter described and particularly pointed out in the claims.

The preferred embodiment of the invention has been illustrated in the accompanying drawings, although no restriction is necessarily made to the precise details of construction therein shown, as changes, alterations, and modifications, within the scope of the claims may be resorted to when desired.

Like characters of reference denote corresponding parts throughout the several views in the drawings, in which:

Figure 1 is a top plan view of a lawn mower constructed in accordance with the invention, the handle thereof being broken away.

Fig. 2 is a section on the line 2—2 of Fig. 1.

Fig. 3 is a perspective view of an end of the cutter bar.

Fig. 4 is a detail perspective view of the central portion of the cutter bar.

Fig. 5 is a detail perspective view of a portion of the lawn mower frame and an end of a rod for connection therewith.

Fig. 6 is a detail sectional view through a portion of the mower frame showing the mechanism for holding the blade on the cutter bar in the path of movement of the blades on the cutting reel.

Referring now to the drawings in detail, the numeral 1 designates the frame of the lawn mower which comprises spaced plates 2 having arms 3 terminating in extensions 4 with which is connected a ground roller 5, said plates 2 having connected therewith the handle yoke 6.

A reel shaft 7 extends transversely between the plates 2 and has its ends extended beyond the same in order that the reel shaft may be rotated by ground wheels 8 suitably connected with the plates 2 for this purpose.

Rings 9 are fixed to the shaft 7 in spaced relation and have connected therewith blades 10 co-acting with the rings in constituting the cutting reel of the lawn mower.

The outer peripheral surfaces of each ring 9 is recessed as at 11, to provide the rings with cam-faces 12 arranged between the blades 10 for a purpose which will hereinafter appear.

A bar 13 extends transversely of the frame 1 below the axis of the cutting reel and to one side thereof and is provided at its ends with heads 14 in which are formed slots 15, receiving therein ribs 16 on the arms 3. Said bar is detachably connected with the arms by fastening elements 17 which are passed through suitable openings in the arms and extend within the heads 14.

The bar 13 has formed on the side thereof opposite the cutting reel a central enlargement 18 from which extends a stud 19 terminating at its outer end in a ball shaped head 20.

A cutter bar 21 extending transversely of the mower frame between the bar 13 and the cutting reel has formed upon one side thereof between its ends an extension 22, the upper face of the extension is recessed as as 23, with the bottom wall of the recess provided with a depression 24 communicating with a flared passage 25 opening out through the front wall of the extension 22 and receiving therein the stud 19, the head 20 of which is arranged in the depression 24 and retained therein by a plate 26 disposed in the recess 23 and secured to the extension 22 in any suitable manner.

The side of the cutter bar 21 which has formed thereon the extension 22 is provided at each end with a pair of ears 27 with each pair of ears receiving therebetween a roller 28 having its peripheral face bearing against a head 14 on the bar 13, said rollers serving as anti-friction devices.

The opposite side of the cutter bar is provided at each end with an arm 29 having formed therein at one end an opening 30.

The bottom face of the cutter bar 21 is recessed longitudinally for the greater portion of its length to receive a portion of the cutting blade 31, the cutting edge of which extends slightly beyond the free ends of the arms 29 to engage the cutting edge on the blades of the reel during the rotation of the same, said blade being secured to the bar 21 in any suitable manner.

Extending laterally from each arm 3 to over-lie the arm 29 on the cutter bar adjacent thereto is a lug 32 having formed therein an opening 33.

In order that the cutting blade 31 may be held yieldably yet firmly engaged with the blades on the cutting reel, as the blades on the reel pass over the blade on the cutter bar, rods 34 are passed through the openings in the lugs 32 and arms 29 on the cutter bar. Each rod has at one end a ball shaped head 35 held in contact with an arm 29 by a coiled spring 36 encircling the rod 34 and arranged between the lug 32, and a nut 37 adjustably mounted on the rod 34.

An end on each rod 34 has formed therein a slot 38 in which may be inserted a suitable instrument such as a screw driver, or the like, to hold the rod against turning movement while the nut 37 thereon is adjusted to increase or decrease the tension of the spring 36, so that the springs may hold the cutter bar in position to cause the blade thereon to be yieldably yet firmly engaged with the blades on the cutting reel during their passage over the cutter bar.

From the above described manner of connecting the cutter bar with the mower frame and mounting the cutter bar in the cross bar for oscillatory movement below the axis of the cutting reel and to one side thereof, it will be seen with reference to the drawing that a blade and a cam face upon one of the rings on the cutting reel will at all times be in engagement with the blade on the cutter bar, so that as the cutting reel rotates the cam faces on the rings will oscillate the cutter bar to insure the blades on the cutting reel moving thereon and also permit the springs 36 to hold the blade on the cutter bar yieldably, yet firmly engaged with the blades on the cutting reel during their passage over the blade on the cutter bar.

Having thus described the invention, what is claimed as new, is:

1. In a lawn mower, a reel, a cutter bar below the axis of the reel yieldably held for oscillatory movement, a blade on said cutter bar to engage the blades on the reel, and rings on said reel having cam faces thereon to engage the blade on the cutter bar to oscillate the bar.

2. In a lawn mower, a reel, a cross bar below the axis of said reel, a cutter bar yieldably held for oscillatory movement on said cross bar, a blade on said cutter bar to engage the blades on the reel, rings on said reel, cam faces on the rings between the blades on the reel to engage the blade on the cutter bar to oscillate the bar, and rollers at the ends of the cutter bar engaging said cross bar.

3. In a lawn mower, a mower frame, a reel thereon, rings connected with the blades of the reel recessed to provide cam faces between said blades, a cross bar below the axis of the reel connected with the mower frame, a central stud on the side of the cross bar opposite said reel, a cutter bar mounted to oscillate on said stud, rollers on the cutter bar contacting with said cross bar, a blade on the cutter bar in the path of movement of the blades on the reel to be engaged by the cam faces on said rings to oscillate the cutter bar, rods slidably mounted on said frame and engaged with the ends of the cutter bar, springs on said rods engaging said mower frame, and nuts adjustably mounted on said rods engaging said springs.

In testimony whereof I affix my signature.

HYMAN EUGENE COONS.